United States Patent
Beringer et al.

(10) Patent No.: US 7,549,309 B2
(45) Date of Patent: *Jun. 23, 2009

(54) METHOD AND SYSTEM FOR RESTRUCTURING A VISUALIZATION GRAPH SO THAT ENTITIES LINKED TO A COMMON NODE ARE REPLACED BY THE COMMON NODE IN RESPONSE TO A PREDETERMINED STIMULUS

(75) Inventors: Joerg Beringer, Frankfurt (DE); Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 262 days.

This patent is subject to a terminal disclaimer.

(21) Appl. No.: 10/927,315

(22) Filed: Aug. 27, 2004

(65) Prior Publication Data
US 2005/0114383 A1   May 26, 2005

(30) Foreign Application Priority Data
Aug. 29, 2003 (EP) ................... 03077697
Nov. 14, 2003 (EP) ................... 03078584

(51) Int. Cl.
G06F 17/00 (2006.01)
G06F 17/30 (2006.01)
G09G 5/00 (2006.01)

(52) U.S. Cl. ............. 70/102; 707/1; 707/3; 707/104.1; 345/619

(58) Field of Classification Search ........... 707/1–3, 707/100–104.1, 200; 345/428, 440, 619, 345/650, 661, 676; 715/854
See application file for complete search history.

(56) References Cited

U.S. PATENT DOCUMENTS 5,590,250 A * 12/1996 Lamping et al. ............ 345/427
5,619,632 A *  4/1997 Lamping et al. ............ 345/441
5,740,440 A     4/1998 West
6,144,962 A    11/2000 Weinberg et al.
6,154,213 A    11/2000 Strausfeld et al.

(Continued)

FOREIGN PATENT DOCUMENTS

EP     1050829 A2 * 11/2000

(Continued)

OTHER PUBLICATIONS

Fluit et al. ("Ontology-based Information Visualisation", Springer Verlag, 2002, retrieved from http://www.cs.vu.nl/~frankh/abstracts/VSW02.html, on Jan. 18, 2007).*

(Continued)

Primary Examiner—Srirama Channavajjala
(74) Attorney, Agent, or Firm—Finnegan, Henderson, Farabow, Garrett & Dunner, LLP

(57) ABSTRACT

A visualization graph is provided on a computer. Data is stored corresponding to a plurality of entities, wherein a semantic net includes the entities and wherein the entities are linked to each other by a plurality of relations. In response to a query with respect to an entity selected from the plurality of entities, a visualization graph representing the results of the query is provided. Entities are selected from the plurality of entities having at least one common relation and storing the selected entities as a plurality of groups.

7 Claims, 9 Drawing Sheets

U.S. PATENT DOCUMENTS

| | | | |
|---|---|---|---|
| 6,154,220 | A | 11/2000 | Ling et al. |
| 6,216,134 | B1 | 4/2001 | Heckerman et al. |
| 6,266,805 | B1 | 7/2001 | Nwana et al. |
| 6,285,951 | B1 | 9/2001 | Gaskins et al. |
| 6,369,819 | B1 | 4/2002 | Pitkow et al. |
| 6,434,556 | B1* | 8/2002 | Levin et al. ............... 707/5 |
| 6,480,843 | B2 | 11/2002 | Li |
| 6,556,983 | B1* | 4/2003 | Altschuler et al. ........... 706/55 |
| 6,583,794 | B1 | 6/2003 | Wattenberg |
| 6,646,652 | B2 | 11/2003 | Card et al. |
| 6,654,761 | B2 | 11/2003 | Tenev et al. |
| 6,714,936 | B1 | 3/2004 | Nevin, III |
| 6,792,400 | B2 | 9/2004 | Alden et al. |
| 6,795,825 | B2 | 9/2004 | Rishe |
| 6,868,525 | B1 | 3/2005 | Szabo |
| 6,888,548 | B1 | 5/2005 | Gallivan |
| 6,981,228 | B1 | 12/2005 | Chen et al. |
| 7,089,266 | B2 | 8/2006 | Stolte et al. |
| 7,167,865 | B1 | 1/2007 | Tharp et al. |
| 2002/0087275 | A1* | 7/2002 | Kim et al. ............... 702/19 |
| 2002/0130907 | A1 | 9/2002 | Pirolli et al. |
| 2002/0133392 | A1* | 9/2002 | Angel et al. ............... 705/10 |
| 2002/0154175 | A1* | 10/2002 | Abello et al. ............. 345/853 |
| 2002/0158918 | A1 | 10/2002 | Feibush et al. |
| 2002/0196292 | A1 | 12/2002 | Itoh et al. |
| 2003/0011601 | A1 | 1/2003 | Doi et al. |
| 2003/0085931 | A1 | 5/2003 | Card et al. |
| 2003/0167324 | A1 | 9/2003 | Farnham et al. |
| 2003/0220928 | A1* | 11/2003 | Durand et al. ............ 707/100 |
| 2004/0024533 | A1 | 2/2004 | Ohta |
| 2004/0030741 | A1* | 2/2004 | Wolton et al. ............. 709/202 |
| 2004/0059521 | A1* | 3/2004 | Han et al. ............... 702/19 |
| 2004/0113953 | A1 | 6/2004 | Newman |
| 2004/0133433 | A1 | 7/2004 | Lee et al. |
| 2005/0116953 | A1 | 6/2005 | Liongosari et al. |
| 2006/0037019 | A1 | 2/2006 | Austin et al. |
| 2006/0044319 | A1 | 3/2006 | Molesky et al. |
| 2006/0106847 | A1* | 5/2006 | Eckardt et al. ............ 707/101 |
| 2007/0124291 | A1* | 5/2007 | Hassan et al. ............... 707/3 |

FOREIGN PATENT DOCUMENTS

| | | |
|---|---|---|
| WO | WO 01/88751 | 11/2001 |
| WO | WO 02/069192 | 9/2002 |
| WO | WO 03/069506 | 8/2003 |
| WO | WO 2007/062885 | 6/2007 |

OTHER PUBLICATIONS

Greg Butler et al "A Graph Database With Visual Queries for Genomics", Proceedings Trim Size: 9.75in x 6.5in, Sep. 28, 2004, 10 pages.*
Kenneth Moreland and Brian Wylie, "Massive Graph Visualization: LDRD Final Report", Oct. 2007, 48 pages.*
Dennis P. Groth, "Visual Representation of Database Queries using Structural Similarity", Proceedings of the Seventh International Conference on Information Visualization (IV'03), 2003 IEEE 6 pages.*
U.S. Appl. No. 10/927,313, filed Aug. 27, 2004, entitled "Methods and Systems for Providing a Visualization Graph."
U.S. Appl. No. 10/927,316, filed Aug. 27, 2004, entitled "Methods and Systems for Providing a Visualization Graph."
U.S. Appl. No. 10/927,458, filed Aug. 27, 2004, entitled "Methods and Systems for Providing a Visualization Graph."
Herman et al., "Graph Visualization and Navigation in Information Visualization: A Survey," IEEE, Jan.-Mar. 2000, pp. 24-43.
Chapter 15: Topic Maps in Knowledge Organization, Jul. 16, 2002, XML Topic Maps: Creating and Using Topic Maps for the Web, Addison Wesley Professional.
Communication from the EPO, dated Jan. 16, 2007 for European Application No. 03 078 583.6-1225, 8 pages.
Communication from the EPO, dated Jan. 17, 2007 for European Application No. 03 078 584.4-1225, 8 pages.
Communication from the EPO, dated Jan. 17, 2007 for European Application No. 03 078 586.9-1225, 8 pages.
Communication from the EPO, dated Jan. 19, 2009 for European Application No. 03 078 583.6-2221, 9 pages.
Communication from the EPO, dated Jan. 20, 2009 for European Application No. 03 077 697.5-2221, 9 pages.
Communication from the EPO, dated Jan. 20, 2009 for European Application No. 03 078 584.4-2221, 10 pages.
Communication from the EPO, dated Jan. 20, 2009 for European Application No. 03 078 585.1-2221, 9 pages.
Communication from the EPO, dated Jan. 20, 2009 for European Application No. 03 078 586.9-2221, 9 pages.
Communication from the EPO, dated Jul. 5, 2004 for European Application No. 03 078 585.1-1225, 4 pages.
Communication from the EPO, dated Nov. 8, 2006 for European Application No. 03 078 585.1-1225, 9 pages.
Communication from the EPO, dated Oct. 26, 2006 for European Application No. 03 077 697.5-1225, 6 pages.
Gansner, Emden R., et al., "An open graph visualization system and its applications to software engineering," Prepared using speauth.cls [Version: 1999/06/11 v1. 1a], Software-Practice and Experience, 1999, pp. 1-29.
Golovchinsky, G. et al., "Subverting structure: data-driven diagram generation," Visualization, 1995, Visualization '95. Proceedings, IEEE Conference in Atlanta, Georgia, Oct. 29-Nov. 3, 1995, Los Alamitos, California, pp. 217-223.
Halin, Gilles, "An interactive graph visualization for handling cooperative design activity context," The 11th International Conference on CSCW in Design, Melbourne, Australia, 2007, pp. 1-5.
Huang, Mao Lin, "Information Visualization of Attributed Relational Data," 2001, Australian Computer Society, Inc. This paper appeared at the Australian Symposium on Information Visualization, Sydney, Dec. 2001. Conferences in Research and Practicein Information Technology, vol. 9, 7 pages.
Hull, R. et al., "Semantic database modeling: survey, applications and research issues," ACM Computing Surveys, Acm, New York, NY, Sep. 1, 1987, pp. 201-260.
Marshall, Scott, Methods and Tools for the Visualization and Navigation of Graphs, 2001, Universite Bordeau 1, Bordeaux, France, 78 pages.
Mutton, Paul et al., "Visualization of Semantic Metadata and Ontologies," Proceedings of the Seventh International Confernece on Information Visualization (IV'03), 2003, IEEE, 6 pages.
Nguyen, Quang Vinh, et al., "A space-optimized tree visualization," Information Visualization, 2002, INFOVIS 2002, IEEE Symposium, Oct. 28-29, 2002, pp. 1-8.
Partial European Search Report for European Application No. 03 077 697.5-1225, dated Jun. 18, 2004, 5 pages.
Sheth, Nihar et al., "Visualizing MeSH Dataset Using Radial Tree Layout," Published on Apr. 29, 2003, pp. 1-11.
Staszak, C., "Semantic Network Picture Book," 2002, pp. 1-4.
Wills, Graham J., "NicheWorks—Interactive Visualization of Very Large Graphs," 1999, pp. 190-212, XP007906624, Retrieved from the Internet: URL:http://www.amstat.org/PUBLICATIONS/jcgs/pdf99/wills.pdf>.

* cited by examiner

METHOD AND SYSTEM FOR RESTRUCTURING A VISUALIZATION GRAPH SO THAT ENTITIES LINKED TO A COMMON NODE ARE REPLACED BY THE COMMON NODE IN RESPONSE TO A PREDETERMINED STIMULUS

This application is based upon and claims the benefit of priority from prior patent application EP 03077697.5, filed Aug. 29, 2003, and prior patent application EP 03078584.4, filed Nov. 14, 2003, the entire contents of each which are expressly incorporated herein by reference.

BACKGROUND

I. Technical Field

The present invention relates to a methods and systems for providing a visualization graph on a computer.

II. Background Information

Visualization graphs are tools that allow data to be handled and displayed on a display device according to certain criteria. The primary objective of navigation graphs is to display systems of complex interrelationships between entities, such as in a database or on the World Wide Web. Visualization graphs can be based on a semantic net including all entity types that occur where the considered entities are linked to each other by various kinds of relations. A visualization graph represents entities as boxes, often referred to as "nodes" of the graph, and relations as lines between the boxes.

A common way of solving the problem of graphical layout is to apply a physical simulation where all entities are treated as masses repulsing each other and the relations are treated as elastic lines trying to pull connected entities together. By double-clicking on a box, other entities that are directly related to the corresponding entity (but which may not yet in the graph) and their relations to other entities in the graph are included. In some implementations the double-clicked entity then moves to the center of the graph (it becomes the "focus" entity) and other nodes, which are too distant (measured in number of relations on the shortest path) from it are removed from the graph.

However, conventional visualization graphs suffer drawbacks. One problem with conventional visualization graphs is that when the number of entities becomes large, the display becomes crowded. This leads to an inefficient use of the display. Also, it becomes more difficult for the user to access information easily.

SUMMARY

Consistent with the present invention, a method of providing a visualization graph on a computer comprises storing data corresponding to a plurality of entities, wherein a semantic net includes the entities and wherein the entities are linked to each other by a plurality of relations; in response to a query with respect to an entity selected from the plurality of entities, providing a visualization graph representing the results of the query; and selecting those entities from the plurality of entities having at least one common relation and storing the selected entities as a plurality of groups.

By grouping of entities with common relations and display of the group as one node (represented as an ellipse rather than a box in FIGS. 3 and 4) in the graph, an efficient representation of the entities and an efficient use of the graph is achieved. Further, characteristics are used to identify common relations in such a way that a good distribution of nodes is achieved.

Consistent with the present invention, a computer provides a visualization graph, the computer comprises a storage medium having recorded therein processor readable code processable to provide a visualization graph; a database for storing data corresponding to a plurality of entities, wherein a semantic net includes the entities and wherein the entities are linked to each other by a plurality of relations; a query interface adapted, so that in response to a query with respect to an entity selected from the plurality of entities, a visualization graph is provided representing the results of the query, wherein the code includes selection code processable to select those entities from the plurality of entities having a common relation 8 and storing the selected entities as a plurality of groups.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
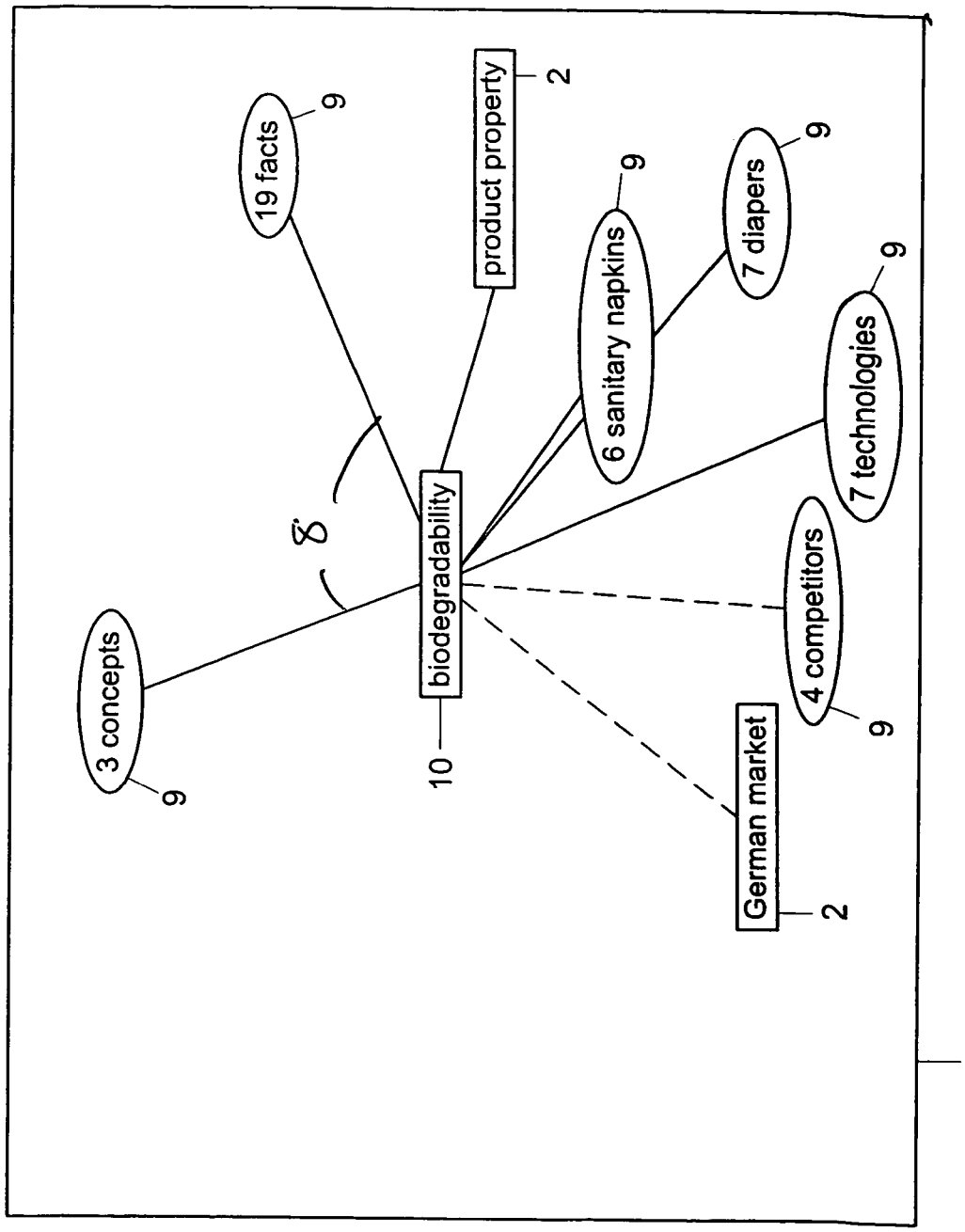
FIG. 1 shows a grouping in a visualization graph.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 2:
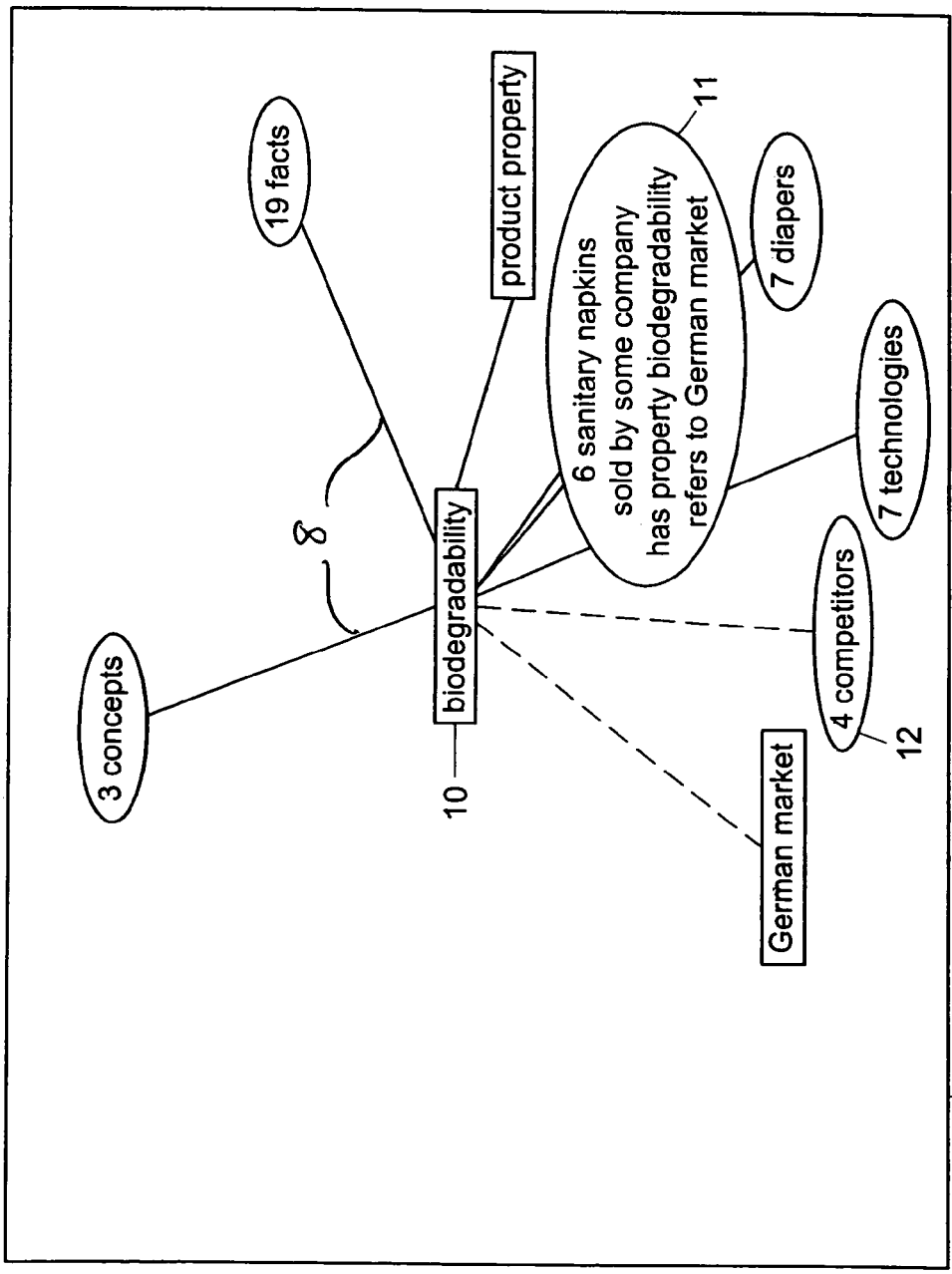
FIG. 2 shows further details of the visualization graph shown in FIG. 1.
Figure 3:
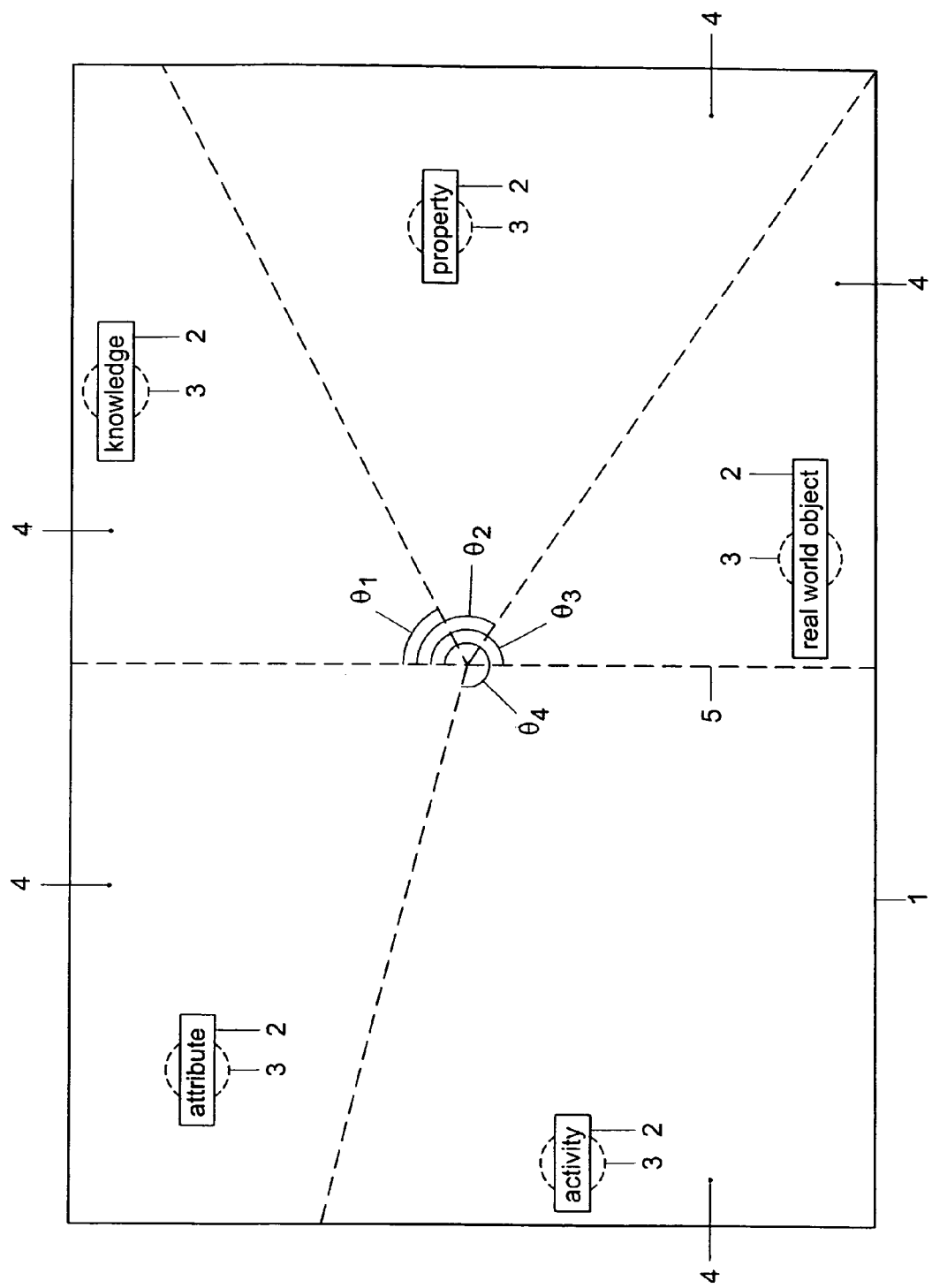
FIGS. 3-6 show visualization graphs according to embodiments of the present invention.
Figure 4:
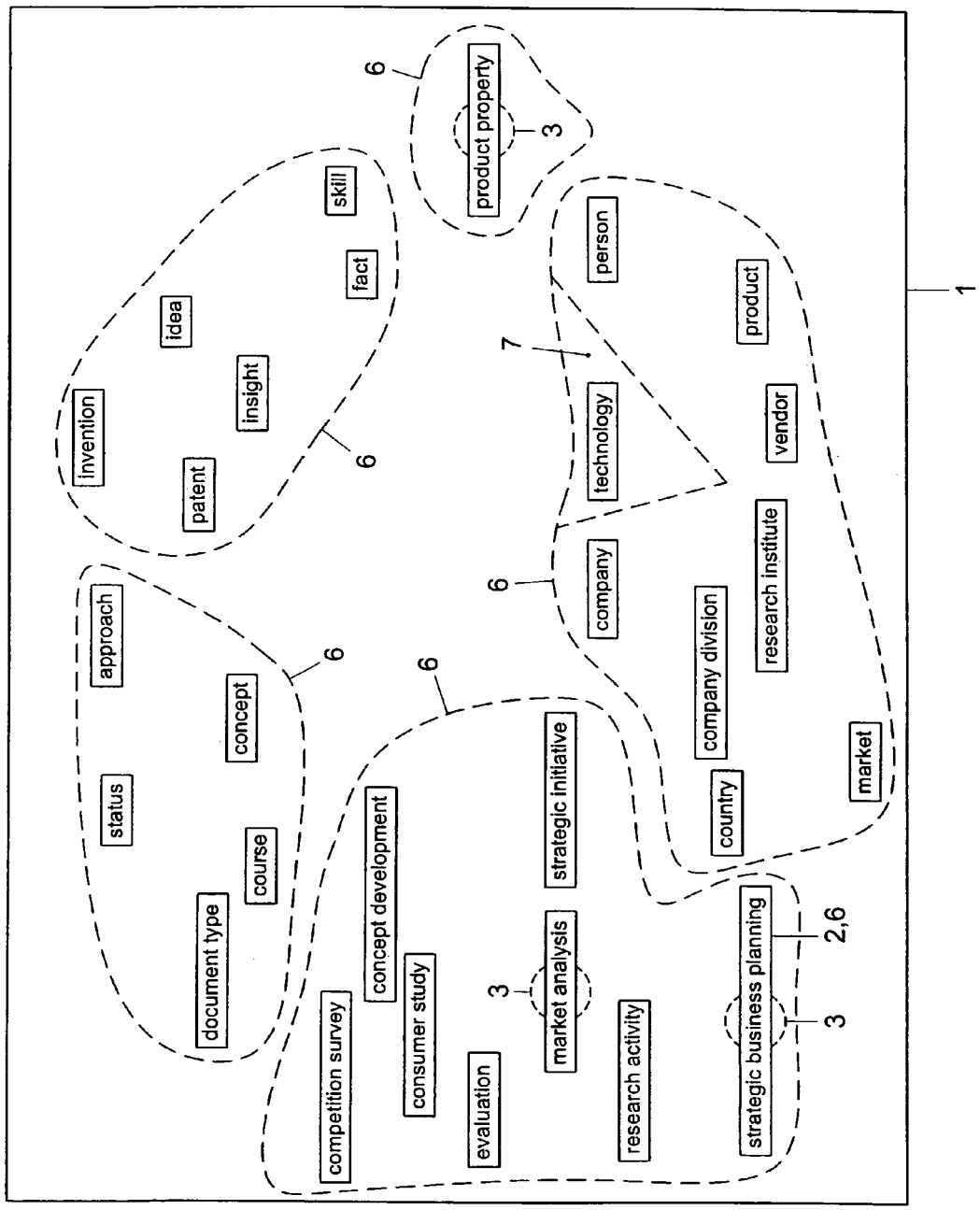

FIGS. 1-8 show visualization graphs according to examples of embodiments of the present invention. FIG. 3 shows details of a visualization graph 1 wherein a plurality of entities 2 are displayed. Each entity is represented by a square box. The entities 2 shown in FIG. 3 are represent top level types, referred to hereinafter as types. FIG. 4 shows details of a visualization graph 1 wherein a plurality of sub-entities 4 are displayed. Each sub-entity 4 is represented by a square box. The sub-entities 4 shown in FIG. 4 represent second level entity types, hereinafter referred to as sub-types.

The entities 2 and sub-entities are typically modeled as a mass. There is a repulsive force exerted by a repulsor between each pair of entities. The repulsive force may be inversely proportional to the distance or the square of the distance, or any other inverse relationship. The relations 8 between entities (not shown in FIG. 3) are modelled as springs, typically linear springs. The model provides damping to ensure that the system converges. When energy is put into the system, for example, when entities 2,4 are introduced into the graph or moved, the system is modelled to adopt the lowest energy level. For each entity or node (refer to FIG. 1), the distance and repulsive force is calculated from other entities and nodes. The forces are added to obtain a force vector. The reaction of the system in terms of acceleration and deceleration is dependent on the force vector.

Groups of entities sharing at least one relation 8 may be bundled together and displayed as a node 9, as seen in FIG. 1. Nodes 9 and entities 2 may be displayed together on the same graph as seen in FIG. 1, wherein relations 8 common to entities 2 and nodes 9 are displayed as a line linking the appropriate entities and/or nodes.

Any particular graph may be arranged so that the relations 8 with respect to a particular entity 2, 4 or node 9 are displayed. In this case, the entity 2, 4 or node 9 in question, is referred to as the focus entity or node 10 and is typically displayed in a central region of the graph.

FIG. 1 shows a visualization graph according to an example of an embodiment of the present invention. In particular, FIG. 1 shows a focus entity 10 with related entities 2 and those comprised in nodes 9, clustered by entity type. The dashed lines indicate indirectly related items, "competitors," "market," selected due to user preferences.

FIG. 2 shows further details of the visualization graph shown in FIG. 1. In 10 particular, FIG. 2 depicts a display of a group's common relations 8 as indicated when a mouse, or other indicator adapted for use with a computer, is passed over the desired node (MouseOver).

As shown in FIGS. 1 and 2, to avoid a visualization graph 1 getting crowded and the data complex to navigate as a result, groups of entities 9 with common relations 8 are bundled and displayed as group nodes 9 (FIG. 1). The common relation 8 of the entities of a particular group node defines the focus entity. Of all possible groupings those are selected which result in the most even distribution of entities 2 (also referred as elements) over the groups and which form groups of entities 2 (elements) which have at least two relations 8 in common.

The common relations 8 may be explicitly assigned to each entity in a group, but they may also be abstractions of the individual relations 8. This embodiment is shown in FIG. 2, where the common relations 8 of the group "sanitary napkins" are displayed: each of these products has got a relation 8 "refers to German market" and a relation 8 "has property biodegradability". These are direct relations 8. For example, a company having access to the graph sells two products in the group and competing companies sell the remaining products. Since the semantic net contains the information that all 6 those are companies, a common abstract relation 8 "is sold by some company" is created, which also characterizes the elements of the group. The selection code is dynamic resulting in a dynamic grouping of the entities. That is, depending on certain criteria such as the context, the selection and abstraction, if applied, may at different times provide different groupings.

In a preferred embodiment, the method may include the further step of representing the groups on the graph 1 as a plurality of nodes 9, and representing only those relations 8 which all of the nodes 9 have in common. By doing so, the use of the graph is further improved. In a further embodiment, the selecting step includes abstracting the relations 8 to identify the common relation 8. This provides an even distribution of nodes in the graph.

In a further embodiment, to further improve the predictability of the selection, facets are introduced. In particular, in order to increase the predictability with regard to what common relation 8 will be chosen as criterion to form groups, the user may define facets for each entity type. "Types" are discussed in more detail below with reference to FIGS. 3 and 4. Facets are predefined groups that are characterized by the entity type of their elements or the kind of relation 8 that connects their elements to the focus entity.

In the example, the following facets have been defined for product properties: knowledge, products, technologies, persons, life cycle phases, companies, ideas, insights, facts, concepts, approaches, activities. If facets are defined, all entities related to the focus entity will be sorted into the corresponding facets (groups) and the dynamic grouping algorithm is used only to subdivide these facets into smaller groups (if possible).

FIGS. 3 and 4 show examples of embodiments of the present invention. In particular, FIG. 3 shows the position of attractors for top-level entity types, also referred to as "types" and FIG. 4 shows the approximate position of attractors for second-level entity types, also referred to as "sub-types." FIG. 3 shows details of a visualization graph 1 wherein a plurality of entities 2 are displayed. Associated with each entity is an attractor 3. The attractors do not appear on the graph to a user, but are schematically depicted as dotted circles 3.

To facilitate orientation, certain types (or kinds) of entities 2 are arranged to appear in the same sector 4 of the graph 1. According to further embodiments of the present invention, a 360°-approach is proposed. A further embodiment is based on a non-deterministic approach, using attractors and repulsors. A second further embodiment, is based on a 15 deterministic approach using a dynamic, but deterministic, subdivision of the screen and screen areas into sectors and sub-sectors, wherein entity types are allocated to sectors and entity sub-types are allocated to sub-sectors, respectively.

Figure 8:
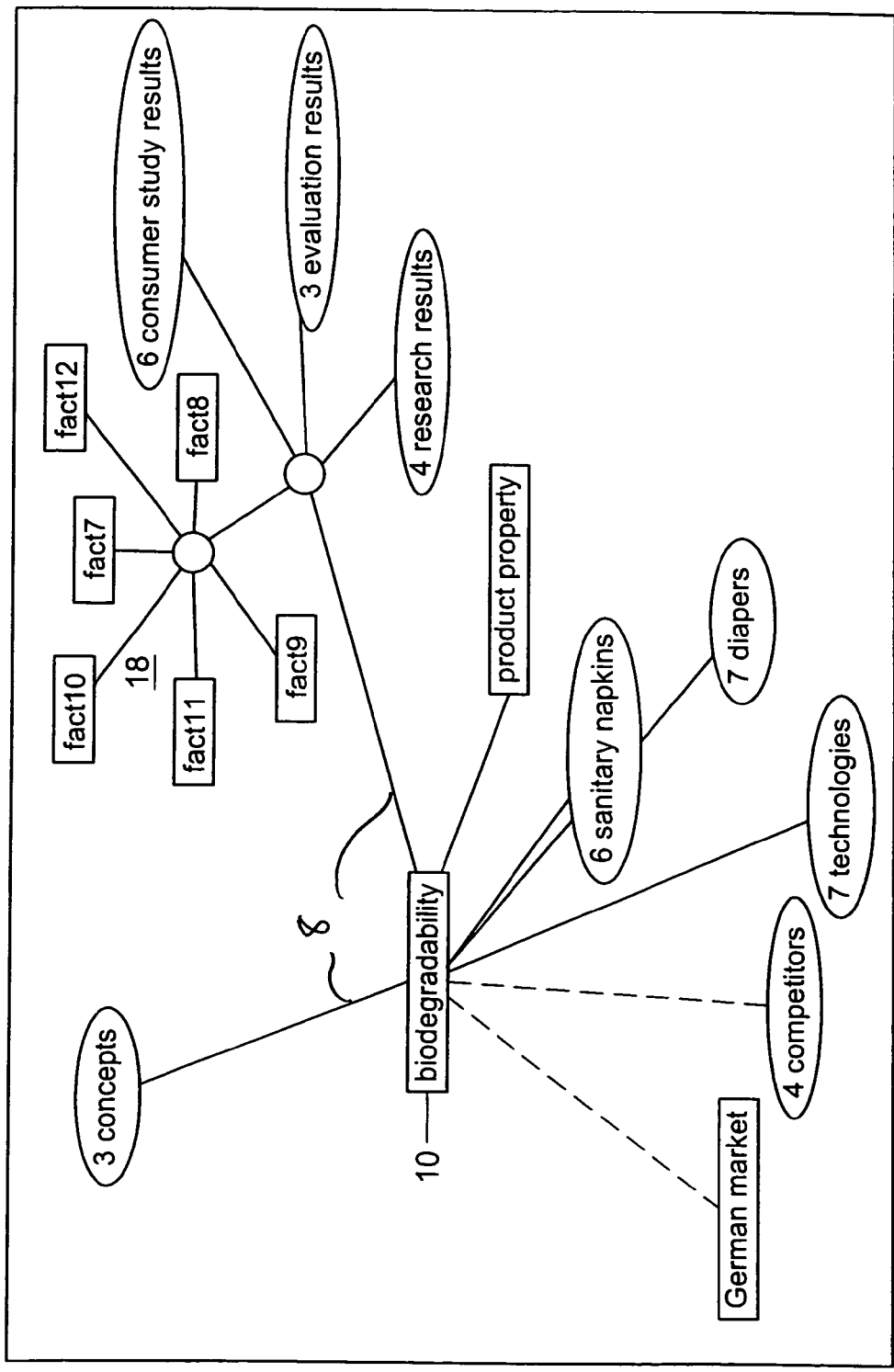
FIG. 8 shows further details of the visualization graph shown in FIG. 7.

A first further non-deterministic embodiment is now described. To facilitate orientation certain kinds, such as types, of entities 2 are arranged to appear in the same sector 4 of the graph. Invisible attractors 3 that are not visible to a user of the graph are introduced for each entity type. In the example, shown in FIG. 1 the types are "attribute," "knowledge," "property," "real world object," and "activity." These may be referred to as top-level entity types. The angle theta 1-theta 4 of each attractor 3 with respect to a reference may be set by customizing and is inherited by all subtypes (refer to FIG. 4 which depicts subtypes 6, wherein subtypes are entities 2 which have a type falling within the scope of a top-level type). For example, in FIG. 4 "strategic business planning" is a sub-type of "activity". It is seen in FIGS. 3 8 and 4 that within each sector 4, 7 the entities to be placed are arranged in FIG. 3 in an ellipse, whereas in FIG. 4, because there are more entities to be arranged, and thus force vectors are more complex, in each sector 4, the sub-type entities, rather than being arranged in an ellipse are arranged in a more nebulous arrangement. Further, because the force vectors are more complex in FIG. 4, where a large number of entities are located in a relatively small area, the location of each entity does not correspond exactly to the location of its respective attractor, because the repulsive forces between entities also play a role in the location of the entity. Thus, FIG. 4 shows the approximate location of the attractors 3 as dotted lines.

It will be understood that the negotiation of sector size determined in accordance with the number of entities and how they are to be distributed causes the graph to have a particular fuzziness. As mentioned, this is achieved by the provision of the attractors 3. In contrast, in conventional graphs, there is no flexibility in the system to expand or contract a sector beyond or within its boundary, respectively, should the need arise when entities are either added or taken away from the sector.

A second further deterministic embodiment is now described. The principle of the second further embodiment may be used to arrange nodes (refer to FIG. 4) in a navigation graph without the use of repulsors and/or attractors. According to a second further embodiment of the present invention, the following steps are carried out. The display, which is typically a computer screen, is divided into sectors 4 assigned to the respective top-level entity types 2. The size of each sector depends on the number of entities or nodes it contains, including all visible subtypes 6. For example, if a larger number of entities are to be placed in a particular sector, that sector will become larger. Then the sectors are recursively divided into subtype sectors 7 and again, their 9 relative size depends on the number of entities they contain. The segmentation of the screen is repeated each time that entities are added to or removed from the graph 1. The distance of the entities or nodes to the center of the graph is an function of the angle in order to avoid collisions (which in the simulative approach are avoided by the repulsive force between entities). It will be understood that whilst the first and second further embodiments may be alternatively implemented, a combination of the first and second embodiments may also be implemented.

Figure 5:
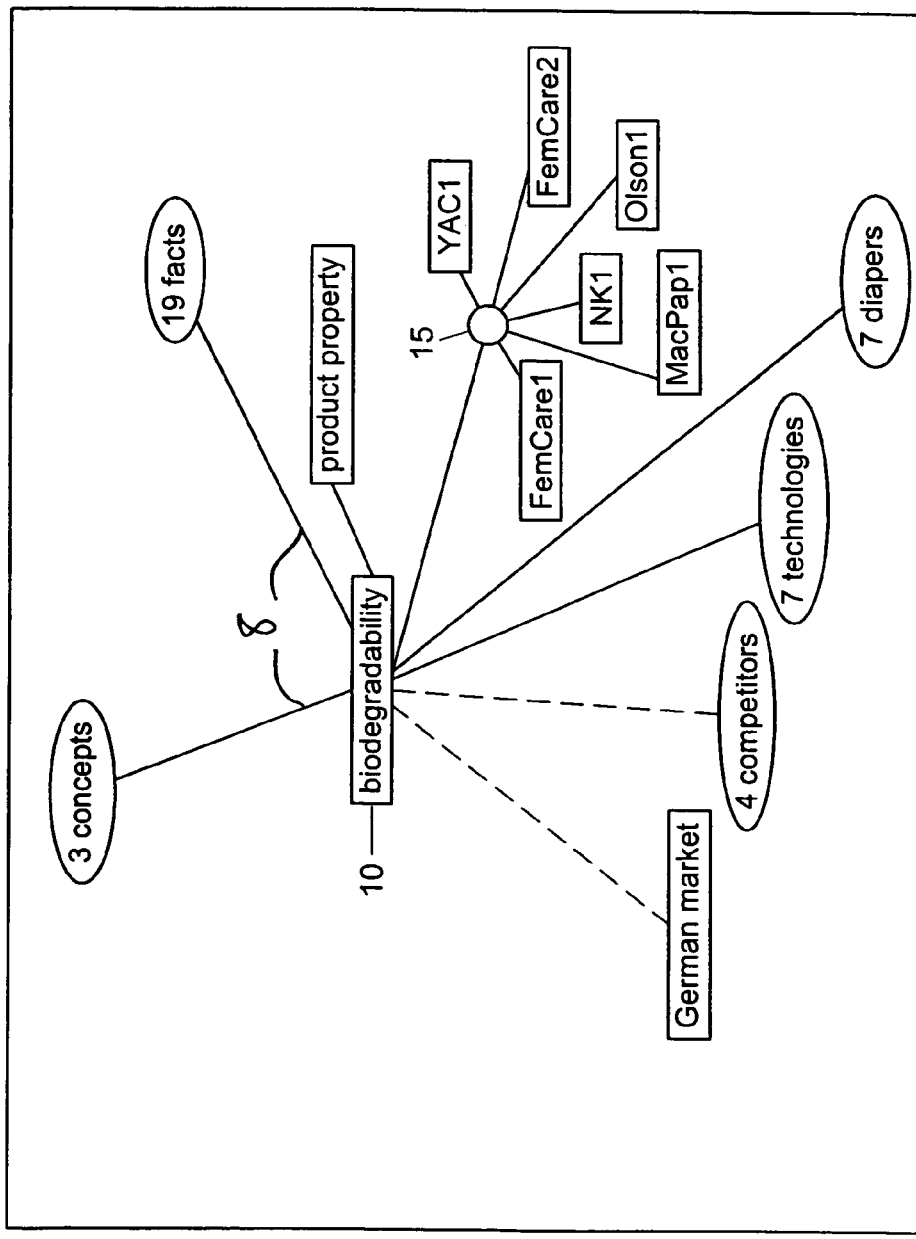
Figure 6:
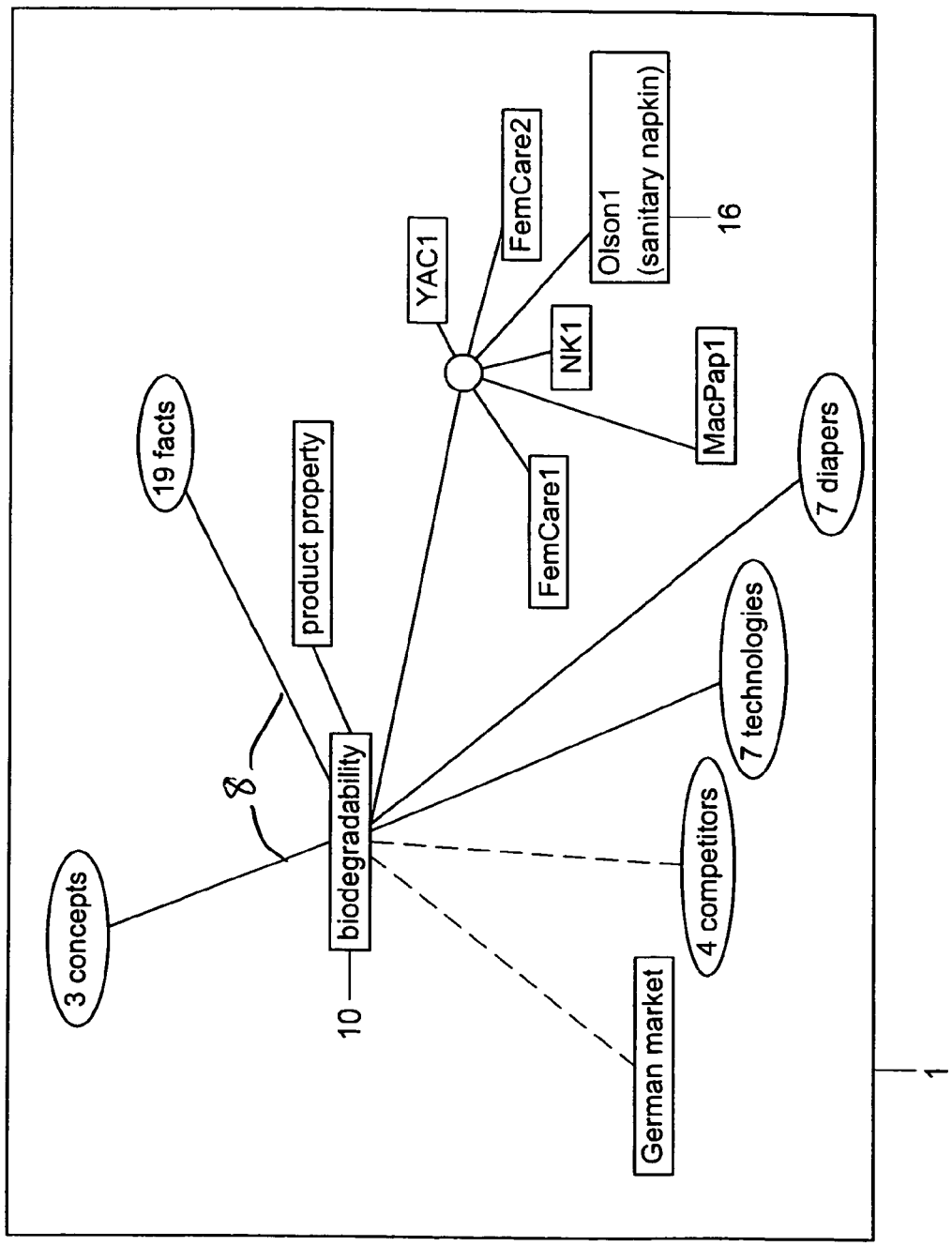
Figure 7:
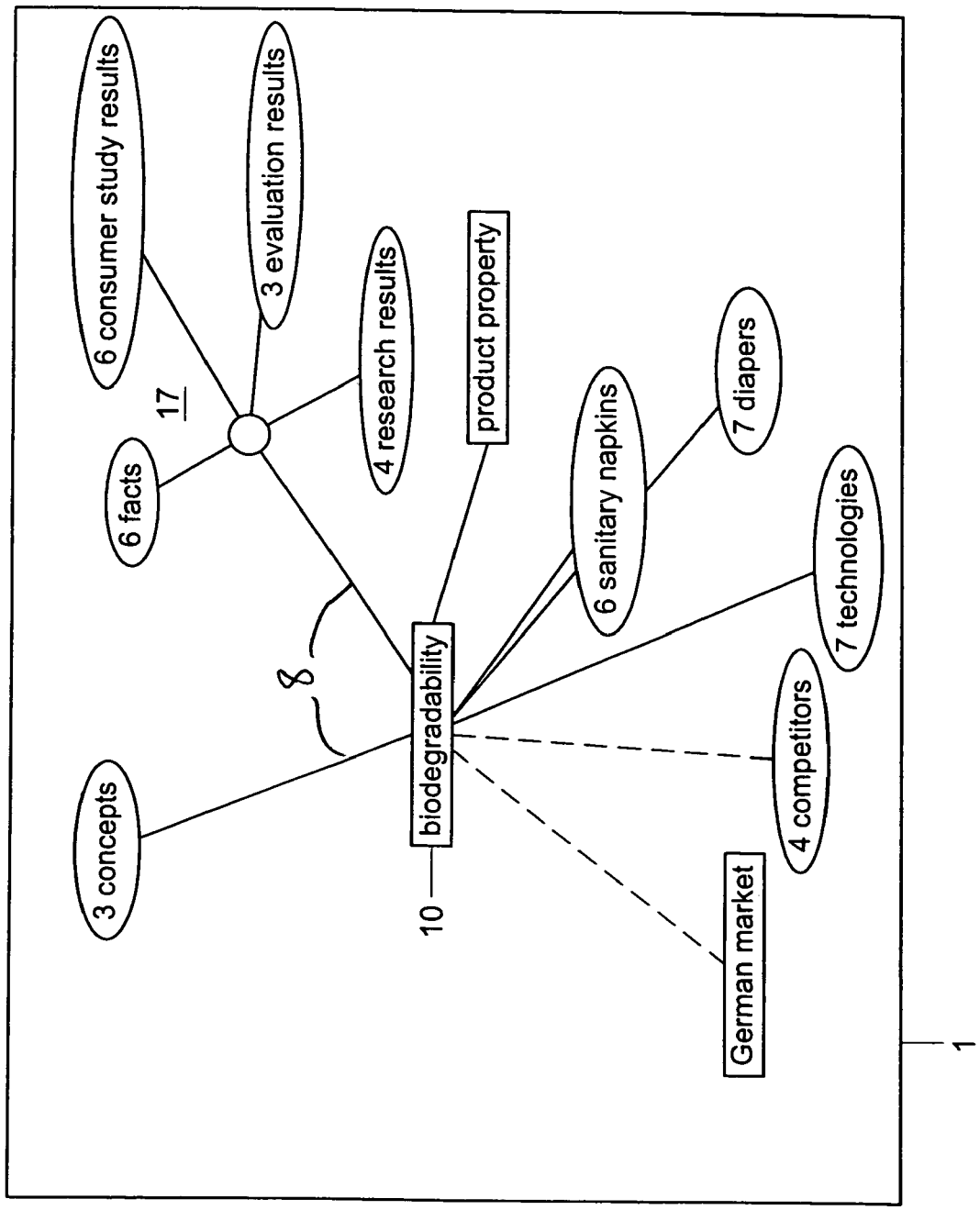
FIG. 7 shows a visualization graph according to a further embodiment of the present invention.

FIGS. 5-8 show visualization graphs according to further examples of embodiments of the present invention. In particular, FIG. 5 depicts an exploding group 15, wherein association of members to group remains visible. FIG. 6 depicts a display of entity type 16 as viewed with the MouseOver function. FIG. 7 depicts an explosion of a group into subgroups 17. FIG. 8 depicts the explosion of a subgroup 18.

As mentioned, in contrast to conventional visualization graphs, an embodiment of the present invention allows the formation of groups in a 2D visualization graph whilst keeping it clear. According to an embodiment of the present invention this is achieved by keeping the space required for the nodes minimal and the origin of the added nodes traceable. Further, the graph is rearranged in a smooth way to avoid confusion of the user. According to an embodiment of the invention, the following steps are taken. Before exploding, the group node increases repulsive force proportionally to the number of entities to be inserted in order to make room for the new nodes. The actual insertion begins, when the neighbor nodes have moved sufficiently far away. Although the new nodes inserted into to the graph have a direct relation 8 to the "focus" node 10, this relation 8 is only displayed indirectly. The new entities are connected to the group node that remains in the graph as "bundler" without label and establishes the relation 8 to the "focus" node 10. Thus the number of lines connected to the center node 10 remains low.

While a group "bundler" node 11 does not have a label in order to save 5 space, the group's characteristics are shown when the user moves the mouse pointer over the "bundler" node 11, in the same way as shown in FIG. 2. Double-clicking a "bundler" node 11 causes group to collapse again into one node. The recursive explosion and collapsing of subgroups 18 is also possible (FIG. 7,8).

The resulting representation looks and behaves similar to a "tree view control". The main difference is that a tree view represents an existing hierarchical structure, whereas the group nodes in the graph dynamically create a hierarchy-like structure in order to get a clearer graph layout. Also the problem of finding a 2D graph layout does not exist for conventional tree view controls.

Further, the method according to an embodiment of the present invention, may 20 include the further steps of representing a plurality of entities 2 having a common relation 8 as a first node 9 on the visualization graph 1, and in response to a predetermined stimulus causing the entities 2 comprised at the first node 9 to be displayed, and in response to a further predetermined stimulus causing the graph to restructure so that the entities 2 displayed are replaced by the node 9. By providing the possibility to explode such groups (i.e. to display all group entities as separate nodes in the graph) by double-clicking and to put them back into the group again, links between nodes representing relations 8 are kept to a minimum which optimizes the energy in the graph. Further, it becomes easier for the user to orientate within the graph, thus, improving his navigation of the information represented in the graph.

As mentioned, in contrast to conventional visualization graphs, an aspect of the present invention the visualization graph layout is such that the number of nodes is kept low without missing out potentially relevant information.

According to an embodiment of the present invention this is achieved in the following way: when the focus of a graph changes, new related entities are inserted, and therefore other entities have to be removed. In conventional visualization graphs, only nodes in the graph are kept which have a distance $d<d_{max}$ from the focus node, where the distance is the number of relations 8 on the shortest path between a node and the focus node> Since the number of nodes usually increases exponentially with dmax, a value of 1 or 2 is appropriate for most purposes.

In order to enhance navigation of the visualization graph, entities of certain types may be included in the graph even if they are far more distant to the focus, if they are considered to be of special interest in the current context either due to their entity type or due to the kind of relations 8 linking them to the focus node.

The context information in this case can be made up, but is not limited, from the following components current user's general preferences, context information attached to the "focus" node, and current user's current role and/or session history.

In FIGS. 1, 2 and 5-8, the entity 2 "German market" and a group of "four competitors" 12 appear in the graph connected with dashed lines to the focus node 10. These entities 12 have no direct relation 8 to the product property "biodegradability," but are related via some products. In this case, the system has been told that if an entity of the type "product property" is in the focus, markets and competitors are of special interest. All markets and competitors in a certain distance d<4 to the entity "biodegradability" are selected and inserted into the graph. More sophisticated algorithms may be applied to find entities of special interest and it is even possible to let the user create context specific algorithms by means of a scripting language or macro recorder.

In a further embodiment of the present invention, the method includes the 10 further steps of: storing 24 data corresponding to a plurality of entities and/or nodes 2, 9, wherein a semantic net includes the entities and/or nodes 2, 9 and wherein the entities and/or nodes 2, 9 are linked to each other by a plurality of relations 8, generating a query, performing the query on the data, and outputting at least two of the plurality of data in the form of a visualization graph 1 representing the results of the query, wherein the graph 1 has a focus entity or node 10 defined by a user or the query, and using context information to determine at least one entity and/or node 2, 9 to be output in the results which is indirectly related to the focus 10. By providing the possibility to display entities that are indirectly related to the "focus" entity based on the current context and user preferences, the user is able to collect additional information even if there is no direct relationship between entities. Thus, allowing the user to "jump" from context to context within the graph. The present invention allows a user to find how large amounts of data are related. The user is able to navigate and explore knowledge domains in a visual way.

Figure 9:
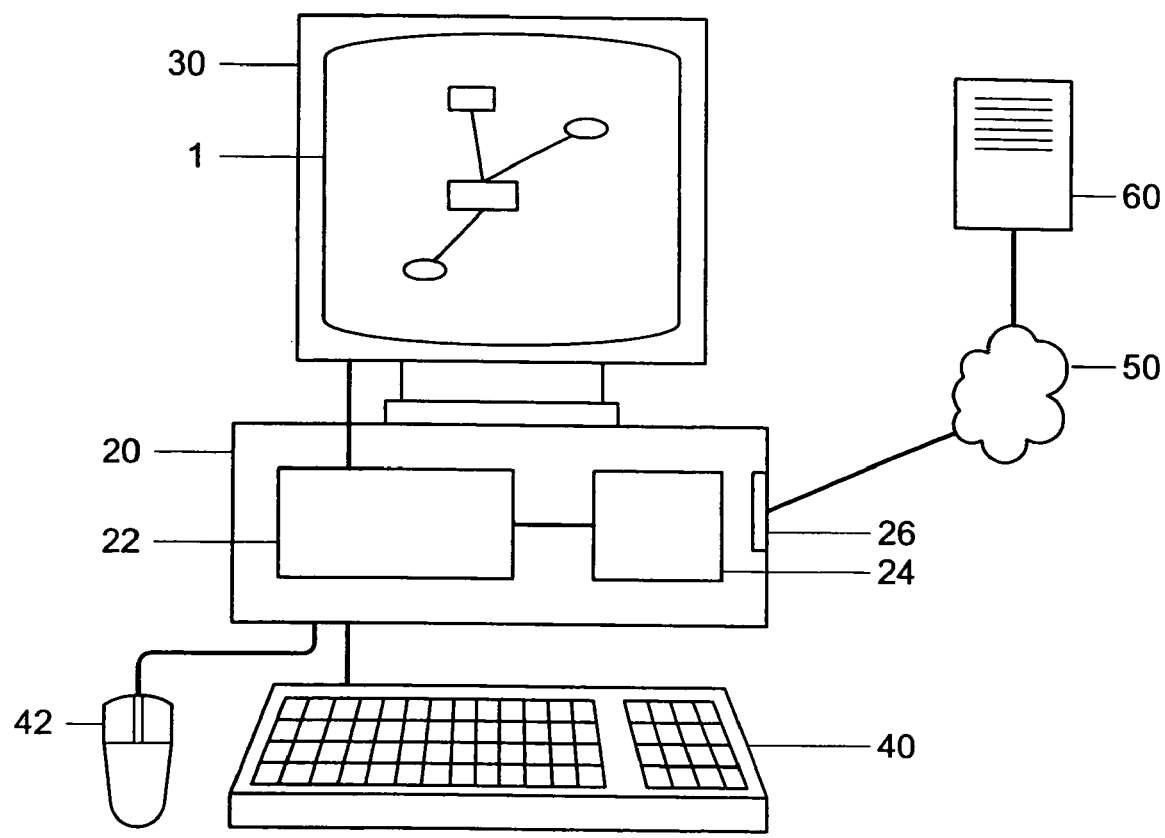
FIG. 9 shows an exemplary computer for carrying out the methods according to embodiments of the invention.

FIG. 9 shows a typical computer arrangement for carrying out the methods according to embodiments of the invention. In particular, FIG. 9 shows a computer 20 including a central processing unit (CPU) 22. The computer further includes a storage medium, which may be located in the CPU 22 and/or elsewhere. In the storage medium processor readable code is stored, which may be read by the CPU 22 to provide a visualization graph. Various codes may be stored the code may include: selection code processable to select those entities from the plurality of entities having a common relation 8 and storing the selected entities as a plurality of groups, representation code processable to represent the groups on the graph as a plurality of nodes, wherein only those relations 8 which all of the nodes have in common are represented, abstraction code processable to abstract the relations 8 to identify the common relation 8. The code may further include representation code processable to represent a plurality of entities having a common relation 8 as a node 9 on the visualization graph, and in response to a predetermined stimulus causing the entities 2 comprised at the node 9 to be displayed, and in response to a further predetermined stimulus, for example, as may be instigated by a mouse click, causing the graph to restructure so that the entities 9 displayed are replaced by the node 9. Also provided is a display device 30, such as a screen, for displaying a visualization graph 1.

The user may use a keyboard 40, mouse 42 or other operating device to communicate with the computer 20 and to instruct the computer to perform a 20 query. The query may be generated automatically or by a user. Context information may be defined in the query. Alternatively, it may not form part of the query, and may be defined in some other way, for example, by user preferences.

In one embodiment, a computer 20 is provided for providing a visualization graph 1, the computer 20 may comprise: a database 24, 60 for storing data corresponding to a plurality of entities and/or nodes 2, 9, wherein a semantic net includes the entities and/or nodes 2, 9 and wherein the entities and/or nodes 2, 9 are linked to each other by a plurality of relations 8, a storage medium 22 having recorded therein processor readable code processable to provide a visualization graph 1, the code including a query code processable to perform a query on the database, an output device 30 for outputting at least two of the plurality of data in the form of a visualization graph 1 representing the results of the query, wherein the graph 1 has a focus entity or node 10 defined by a user or the query, wherein the code further includes context code processable to express context information which is processable to determine at least one entity and/or node to be output in the results which is indirectly related to the focus 10.

Further, the context code may be processable to allow at least one entity 2 and/or node 9 to be output in the results which are indirectly related by more than two relations 8. The context code may also be processable to enable identification of at least one entity and br node 2, 9 having a particular interest with respect to the focus 10, and/or may be processable to identify a particular interest on the basis of an entity 2 or node 9 type or due to the relations 8 linking the entity and/or node 2, 9 to the focus 10. Further, the context code may be determined by any or a combination of: at least one predetermined user preference, information associated with the focus, or a user's current role and/or session history query.

In further embodiments of the present invention, further codes may be stored, such as: an allocator code processable to allocate the entities to a predetermined sector of the graph depending on their entity type, additional entity allocator code processable so that if an additional entity of a particular entity type is stored in a storing step, the location on the graph of the allocated entities is adapted in accordance with the additional entity. The allocator code may include a plurality of attractor codes processable to attract the entities to a predetermined sector of the graph depending on their entity type, respectively, a plurality of repulsor codes processable to repulse the entities allocated to the predetermined sector from one another. The attractor codes and the repulsor codes are processable so that the location of an entity on a graph is determined by the sum of the influence exerted on the entity by the attractor code and the repulsor codes.

The allocator code may further comprise dividing code processable to divide the graph into sectors, wherein an entity is allocated to one of the sectors according to its entity type, and further dividing code processable to further divide the sectors into sub-sectors, wherein an entity is allocated to one of the sub-sectors in accordance with its entity sub-type, wherein the size of the sectors and the sub-sectors is determined in accordance with the number of entities of a particular type allocated to the sector and the number of entities of a particular sub-type allocated to the sub-sector, respectively. The allocator code may also include repeater code processable to activate the dividing code if the number of entities to be displayed on a graph changes.

The processable code may further comprise selection code processable to select those entities from the plurality of entities having a common relation 8 and storing the selected entities as a plurality of groups, representation code processable to represent the groups on the graph as a plurality of nodes, wherein only those relations 8 which all of the nodes have in common are represented.

In one embodiment, the database 24 in which data for building the graph is stored, may be located locally at the computer 20. Alternatively or in addition, the database 60 or an additional database may be located remotely from the computer 20. In such an embodiment, the computer is provided with means to remotely access a remote database. For example, using a modem 26 connected via the Internet 50 or other network or communications link to the remote database 60. Although the embodiment shown in FIG. 9 is a typical Internet configuration, other configurations may also be possible. As mentioned, a stand-alone configuration is also envisaged. Further, the database may be distributed over more than one computer. While parts of the processing may be performed on the user's computer, other parts of the processing may be performed remotely at a remote computer.

In the embodiments of the present invention described above, the visualization graph is concerned with aspects of company dealing with personal hygiene products. However, the invention is not limited in this respect. The present invention finds application in any sphere where data is to be navigated. In particular, where complex interrelationships of data are to be navigated. Further applications are found where data in one or more databases is somehow related to one another. Further applications include Internet applications, where metadata is accessed and used. The expression "visualization graph" is intended to cover visual representations, such as navigation graphs and other such tools.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of providing a visualization graph on a computer comprising:
   storing, in computer memory, data corresponding to a plurality of entities, wherein a semantic net includes the entities and wherein the entities are linked to each other by a plurality of relations;
   in response to a query with respect to an entity selected from the entities, providing a visualization graph representing the results of the query on a display device, wherein the visualization graph includes a focus entity defined by a user or the query;
   using context information to determine at least one entity to be output in the results, wherein the at least one entity is indirectly related to the focus entity;
   selecting, from the visualization graph, a plurality of entity groups, each having a single corresponding group node that is expandable or collapsible, and a unique set of the entities, wherein the set of entities within each of the entity groups share at least two common relations, and the entity groups are selected to result in the most even distribution of entities over the entity groups;
   representing the entities having common relations as being linked to a common node on the visualization graph, wherein the entities linked to the common node are associated with a further entity via a link representing a relation that is not common to all of the entities linked to the common node;
   causing the entities linked to the common node to display in response to a first predetermined stimulus, wherein in response to the first predetermined stimulus, the common node remains in the visualization graph to represent the common relation; and
   causing the visualization graph to restructure so that the entities linked to the common node are replaced by the common node in response to a second predetermined stimulus.

2. The method of claim 1, comprising:
   representing the entity groups on the graph as a plurality of nodes; and
   representing only relations in which all of the nodes are in common.

3. The method of claim 1, wherein the selecting step includes abstracting the relations to identify the common relation.

4. A computer for providing a visualization graph, the computer comprising:
   a storage medium having recorded therein processor-readable code processable to provide a visualization graph, the code including a query code processable to perform a query on the database;
   a database configured to store data corresponding to a plurality of entities, wherein a semantic net includes the entities and wherein the entities are linked to each other by a plurality of relations;
   a query interface adapted, so that in response to a query with respect to an entity selected from the plurality of entities, a visualization graph is provided representing the results of the query, wherein the code includes selection code processable to select, from the visualization graph, a plurality of entity groups, each having a single corresponding group node that is expandable or collapsible, and a unique set of the plurality of entities, wherein the set of entities within each of the entity groups share two common relations, further wherein the entity groups are selected to result in the most even distribution of entities over the entity groups, and the query interface is further adapted to store the selected entities as a plurality of groups;
   an output device configured to output the visualization graph, wherein the visualization graph includes a focus entity defined by a user or the query, and wherein the code further includes context code processable to express context information that is processable to determine at least one entity to be output in the results, wherein the at least one entity is indirectly related to the focus entity;
   wherein the code further includes representation code processable to represent the entities having common relations as being linked to a common node on the visualization graph, wherein the entities linked to the common node are associated with a further entity via a link representing a relation that is not common to all of the entities linked to the common node, and in response to a predetermined stimulus, the representation code causes the entities linked to the common node to display, and in response to a further predetermined stimulus the representation code causes the visualization graph to restructure so that the entities linked to the common node are replaced by the common node.

5. The computer of claim 4, wherein the code further includes representation code processable to represent the entity groups on the graph as a plurality of nodes, wherein only relations for which all of the nodes are in common are represented.

6. The computer of claim 4, wherein the code further includes abstraction code processable to abstract the relations to identify the common relation.

7. A program storage device readable by a processing apparatus, the device embodying instructions executable by the processor to perform the steps of:
   storing data corresponding to a plurality of entities, wherein a semantic net includes the entities and wherein the entities are linked to each other by a plurality of relations;
   in response to a query with respect to an entity selected from the, providing a visualization graph representing the results of the query on a display device, wherein the visualization graph includes a focus entity defined by a user or the query;

using context information to determine at least one entity to be output in the results, wherein the at least one entity is indirectly related to the focus entity;

selecting, from the visualization graph, a plurality of entity groups, each having a single corresponding group node that is expandable or collapsible, and a unique set of the entities, wherein the set of entities within each of the selected entity groups share at least two common relations, and the entity groups are selected to result in the most even distribution of entities over the entity groups;

representing the entities having common relations as being linked to a common node on the visualization graph, wherein the entities linked to the common node are associated with a further entity via a link representing a relation that is not common to all of the entities linked to the common node;

causing the entities linked to the common node to display in response to a first predetermined stimulus, wherein in response to the first predetermined stimulus, the common node remains in the visualization graph to represent the common relation; and causing the graph to restructure so that the entities linked to the common node are replaced by the common node in response to a second predetermined stimulus.

* * * * *